March 9, 1948. A. J. T. GRÖNWALL ET AL 2,437,518
MANUFACTURE OF INFUSION AND INJECTION FLUIDS
Filed May 19, 1944
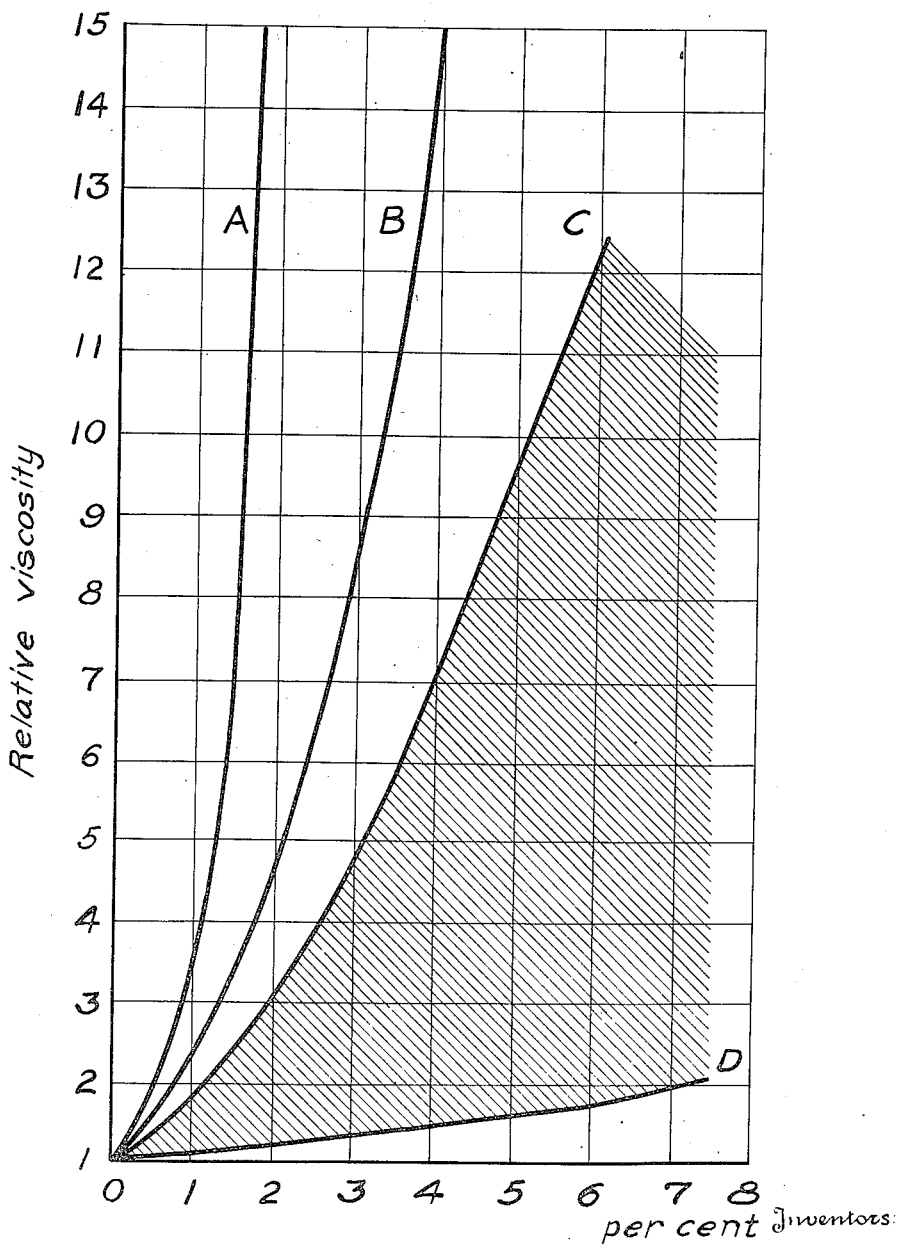
Inventors:
Anders J.T. Grönwall
Björn G.-A. Ingelman
By Henry C. Parker
Attorney Patented Mar. 9, 1948

2,437,518

UNITED STATES PATENT OFFICE 2,437,518

MANUFACTURE OF INFUSION AND INJECTION FLUIDS

Anders Johan Troed Grönwall and Björn Gustaf-Adolf Ingelman, Uppsala, Sweden, assignors to Aktiebolaget Pharmacia, Stockholm, Sweden, a company of Sweden Application May 19, 1944, Serial No. 536,376
In Sweden July 17, 1943

10 Claims. (Cl. 167—78)

The present invention relates to a therapeutic compound to be used as an infusion or injection fluid in replenishing or substituting blood and blood plasma in the circulatory system.

According to the invention the fluid compound is prepared by adjusting the colloid osmotic pressure and the viscosity of suitable salt solutions, by adding thereto water soluble, high-molecular polysaccharidic substances, so called polymeric homologs of polysaccharides, prepared according to the invention by means of a partial hydrolysis of neutral, water-soluble polysaccharides such as dextran, laevulan, galactan etc., so that a fluid compound of a nature corresponding to the blood-plasma in respect to the above mentioned factors is obtained.

Owing to their non-toxic nature and their in other respects favorable physiological qualities these substances are particularly suitable for the above purpose, alone or in combination with such other substances indifferent to the same, which are used in injection or infusion fluids for therapeutic purposes. Their most important characteristic in this connection, namely their water-binding property is demonstrated by the fact that, after being injected in the proper dosage, a clearly noticeable and protracted lowering of the haematocritic values is obtained.

It is previously known that some of these neutral, water-soluble polysaccharides may be isolated from vegetable matter and others produced by microbiological processes from solutions of mono- or disaccharides, both natural solutions thereof in the form of berry-, fruit- or tuber-juices and solutions prepared by dissolving mono- or disaccharides, e. g. saccharose, in water. An example of this is the bacterium Leuconostoc mesenterioides and kindred organisms, which from solutions of saccharides are capable of building up a type of polysaccharides, the so-called dextrans. The chemical formula of such dextrans is in the literature rendered as $(C_6H_{10}O_5)_n$, where $n$ is an integral number, the contention being that these polysaccharides are built up by glucose-rests (gluco-pyranose units) which are condensed into long chains through particularly the C-atoms number 1 and 6, by means of glucoside-bonds. Determinations in connection with the present invention of the mean molecular weight of dextran obtained in the above microbiological way have demonstrated that the molecular weight may be considered to be several millions.

Owing to their high molecular weight, as well as their only partial solubility in water, the microbiologically obtained dextrans present a gelatinous or mucous appearance. It is known that polysaccharides may be hydrolyzed by the action of acids. In the case of dextrans this leads to a complete breaking down of the molecule, glucose directly resulting from this known procedure. Similarly the breaking down of polysaccharides built up by pentose-rests, such as pentosan, results in pentose.

It has now been found, however, that by a suitably regulated hydrolytic treatment it is possible to realize a partial depolymerizing of the dextran molecule, so that so called polymeric homologs, i. e. molecules being mainly built similar to those of the starting material but having another, and in this case lower molecular weight than this, are formed, which by means of e. g. dialysis or precipitation with alcohol may to the desired degree be freed from other products of the breaking down reaction, whereby a partially depolymerized substance having the desired characteristics for use in infusion and injection fluids according to the invention may be obtained. A similar effect is in the same manner obtained with e. g. laevulan and galactan.

These substances, which most likely consist of a mixture of molecules of a somewhat varying molecular weight, thus show a complete solubility in water and yield solutions having viscosities which may be varied within wide limits. The necessary condition for avoiding the hitherto known total breaking down of the microbiologically formed starting material is according to the invention a "mild" hydrolytic treatment, which may be realized by means of observing definite conditions in regard to the concentration of acid, temperature, time and other factors known per se in hydrolytic processes.

Since, however, the three mentioned factors may be varied within quite wide intervals there is still a possibility for carrying out the hydrolysis under different conditions owing to the mutual influence that these factors have upon each other.

A low acid concentration calls for a comparatively long time of hydrolysis and/or a high temperature. A high acid concentration on the other hand calls for a comparatively short time of hydrolysis and/or a low temperature. This is demonstrated by the following Tables I-III which show some examples of the way in which the viscosity of the hydrolysis product is influenced by these factors. The hydrolysis reaction was in this case carried out on a starting material consisting of an 8% solution of a microbiologically obtained dextran using hydrochloric acid. After the hydrolytic treatment the dextran was precipitated with alcohol, dried and dissolved in water to form 6% solutions.

*Table I.—Effect of variations in the acid concentration*

| Time of hydrolysis | Temperature | Concentration of HCl | Relative viscosity of 6% solution |
|---|---|---|---|
|  | °C. |  |  |
| 20 minutes | 87 | 0.080-n | 9.0 |
| Do | 87 | 0.100-n | 7.2 |
| Do | 87 | 0.120-n | 5.4 |
| Do | 87 | 0.140-n | 3.3 |

*Table II.—Effect of variations in the time of hydrolysis*

| Time minutes | Temperature | Concentration of HCl | Relative viscosity of 6% solution |
|---|---|---|---|
|  | Degrees |  |  |
| 14 | 87 | 0.120-n | 9.6 |
| 16 | 87 | 0.120-n | 8.5 |
| 18 | 87 | 0.120-n | 6.5 |
| 20 | 87 | 0.120-n | 5.5 |

*Table III.—Effect of variations in the temperature of hydrolysis*

| Time minutes | Temperature | Concentration of HCl | Relative viscosity of 6% solution |
|---|---|---|---|
|  | °C. |  |  |
| 20 minutes | 70 | 0.120-n | 30.0 |
| Do | 80 | 0.120-n | 12.0 |
| Do | 85 | 0.120-n | 7.3 |
| Do | 90 | 0.120-n | 3.3 |

The above figures clearly indicate the direction in which each of these three main factors influence upon the hydrolysis. It is of course possible to obtain suitable hydrolysis products by employing extremely high or low values for one of these factors if the two others are adjusted accordingly. Thus temperatures from 30° up to 150° C. and times from a few minutes up to 24 hours will be able to combine with acidities from $10-n$ down to extremely low values, as ought to be evident to those skilled in the art, the above rendered figures being in no way limiting for the invention. The main characteristic of the invention in so far as the obtaining of the desired bodies by hydrolysis of the microbiologically produced polysaccharides is concerned, is the fact that an acid hydrolysis is used which in a manner known per se is regulated by adjusting the chief factors governing the hydrolysis so that this will only entail a partial breaking down of the molecule with the formation of products having certain desired properties and characteristics, which are clearly distinguishable and controllable both by physiological tests and methods of physical chemistry.

Thus the hydrolytic conditions according to the above general mode of operation are chosen such that the dextran products show sedimentation constants (determined in ultracentrifuge according to Svedberg) for instance at the concentration 0.7% (in aqueous solution) of from $1.5 \times 10^{-13}$ to $20 \times 10^{-13}$ and with a diffusion constant between the limits $0.2 \times 10^{-7}$ and $8 \times 10^{-7}$. The relative viscosity (water=1) at for instance a concentration of 4% may vary between the limits 1.5 and 15, products yielding a relative viscosity at this concentration of between about 3.5 and 7.5 being particularly suitable. The sedimentation constant for long molecules is dependent upon the concentration in the sense that it increases for a decreasing concentration of the high-molecular substance; it is, however, not a straight line function of the concentration. As a general characteristic of the neutral, water-soluble polymer homologs of polysaccharides obtained and employed according to the invention may be stated, that they should at a concentration of about 6 per cent show a colloid-osmotic pressure of from fifty to one thousand millimeters water column.

In the accompanying drawing a plot is given showing the relationships between the viscosities and concentrations of unhydrolyzed dextran solutions and of dextran preparations the dextran in which has been hydrolyzed in accordance with the present invention. In this showing the concentrations of the solutions in per cent are plotted as abscissas and the corresponding relative viscosities as ordinates. Curve A represents the viscosity-concentration curve of unhydrolyzed dextran. Curve B indicates the upper limits for the viscosities of therapeutically useful solutions of our hydrolyzed dextran for the concentrations indicated. This curve shows, for example, that the maximum relative viscosity corresponding to a concentration of 4 per cent is about 15. These high viscosity preparations are suitable for subcutaneous injections with protracted action. Curve C indicates the upper viscosity limits for our preferred preparations used for intravenous infusions, while curve D represents the lower viscosity limits for these preparations. The shaded area between curves C and D therefore represents the preferred conditions of viscosity and concentration for our hydrolyzed dextran infusion preparations. The curves show that with solutions having a concentration of 4 per cent the relative viscosities should fall within the range of about 1.5 to 7.2 for intravenous infusion preparations, for example. Solutions falling within the shaded area are preferred owing to the facility of obtaining pure preparations within this area showing a complete freedom from undesired physiological reactions in normal use.

In regard to the physiological characteristics the following may be stated in order to elucidate the invention.

Intravenous administration of dextran solutions yields very differing effects according to the molecular weight and also according to the viscosity. It must in this connection be observed that the dextran solutions are not uniform in regard to the size of the molecules, i. e. to the molecular weight, which is a mean value of all the various molecule fragments of the partly hydrolyzed and depolymerized starting product.

Very high-molecular dextran when used intravenously will cause bad injuries particularly to the liver and kidneys, which may be demonstrated in the microscope.

Comparatively low-molecular dextran, on the other hand, does not correspond to the requirements for a blood plasma substitute. It has lost the physical characteristics which would make it suitable as a plasma substitute and the molecules are so small that they will quickly pass through the capillaries of the tissues and the glomerulus membranes in the renal system to the urine. Dextran solutions containing molecules within the interval which yields solutions of the above stated characteristics do, on the other hand, well suit the requirements for a plasma substitute, provided that they have been properly purified.

As representative for suitable procedures for effecting a partial depolymerization of the original polysaccharide and a separation of the product having the desired molecular weight according to the invention, the following Examples 1–3, pertaining to the treatment of dextran, may be rendered.

Example 1

To 600 ml. of a 3.5% aqueous solution of microbiologically obtained dextran were added 5 ml. of concentrated HCl and the solution boiled under reflux for 2 minutes, after which the solution was cooled and neutralized with concentrated NaOH-solution. 800 ml. of alcohol (95%) were added while stirring, whereby the high-molecular decomposition products formed a white precipitate. This precipitate was dissolved in water and dialyzed in a Cellophane bag against water in order to remove low-molecular substances, particularly alcohol. The solution of high-molecular hydrolysis products of dextran obtained in this manner was tested in regard to its physico-chemical characteristics. The relative viscosity was found to be 13.4 at a concentration of 8.67% and 9.95 at a concentration of 7.25%. The sedimentation constant was determined in the ultracentrifuge to $2.7 \times 10^{-13}$ at a concentration of 0.72%. For the diffusion constant a value of $2.0 \times 10^{-7}$ at a concentration of 0.36% and $2.0 \times 10^{-7}$ at a concentration of 0.72% was obtained. No variation in the constant was thus observed within this range.

Example 2

To 450 ml. of a 3.5% dextran solution as in Example 1 were added 30 ml. of concentrated HCl. The solution was boiled for 6 minutes under reflux, cooled and neutralized with concentrated NaOH-solution. The solution was dialyzed in a Cellophane bag against water for 24 hours, after which the solution was evaporated in vacuum (30° C.) to a volume of 72 ml.

Example 3

Microbiologically obtained dextran is purified by re-precipitation with alcohol and the precipitated dextran dried in vacuum at 65° C. 5 kilograms of the dry product are dissolved in 60 liters of water and the solution warmed to 85° C. and kept at this temperature. 1.45 liters of 5-n HCl are added and after 20 minutes is added the calculated amount of alkali for neutralization. Both the acid and the alkali are added under vigorous stirring. The pH is never allowed to exceed 7.0; grams of kieselguhr are added and the solution filtered through a 1 cm. layer of kieselguhr. To the filtrate are added 180 grams of asbestos, after which it is again boiled and filtered. Finally 600 ml. of aluminum hydroxide suspension and 60 grams of sodium chloride are added after which the mixture is again brought to a boil and filtered. The purified solution thus obtained is precipitated with alcohol and the precipitate dried in vacuum.

In order to prepare injection or infusion fluids from the hydrolysis products obtained according to the invention, e. g. as described in the foregoing examples, the following procedure may be followed.

Example 4

The dry depolymerization product obtained according to Example 3 is dissolved in a 3% NaCl-solution to a concentration of 6% dextran. This solution shows a relative viscosity of about 5.5. In order to increase the durability tricresol or other suitable known agent for inhibiting bacterial activity is added, after which the solution is filtered through a glass filter G3 and sterilized for 20 minutes at 120° C. The solution is now ready for use.

Example 5

From a solution of partly depolymerized dextran, e. g. as obtained by a procedure similar to those outlined in Examples 1 and 2, this is precipitated e. g. with twice the volume of 95% strength alcohol. The alcohol containing precipitate is dissolved in distilled water to suitable concentration and dialyzed for 24 hours in a Cellophane bag against distilled water. To the solution is added NaCl so that the concentration of this will be 0.9%. In this way a solution is obtained having the following characteristics: The solution contains 6.5% of partly hydrolyzed dextran, it is of neutral reaction, its colloid-osmotic pressure is 450 millimeters water column and its relative viscosity 6.2. (The colloid-osmotic pressure is measured with an onkometer according to Krogh and Nakazawa and the viscosity with a viscosimeter according to Ostwald.) This solution is ready for use as an injection or infusion fluid for shock-relief.

In comparison to previously suggested plasma-substitutes, such as gum arabic, polyvinyl alcohol, polyvinyl pyrrolidone, gelatine, pectin and others, the solutions obtained according to the invention present definite and outstanding advantages. The therapeutic use of the enumerated known substances has frequently been combined with certain disadvantages, such as immediate injury to the tissues of the liver, kidneys and other internal organs as well as injuries due to the fact that the substances cannot be broken down or excreted by the organism but will instead become stored e. g. in the liver. Quite generally this may be said to be due to the fact that these substances are "foreign" to the organism. Dextran is, as a matter of fact, also a substance which does not naturally occur in the organism, but it is less "foreign" than any other substance previously suggested for use as a plasma-substitute for the reason that it is entirely built up by glucose. The fact that dextran is a high polymerized substance is no reason to question its applicability since a polymerisate of glucose is physiologically present in glucogene. Other neutral polymers of glucose, such as starch and glucogene are quickly broken down by the starch-decomposing enzymes of the human organism, for which reason they are unsuitable as plasma-substitutes. The dextran, however, prepared according to the invention is only very slowly attacked and decomposed by amylases.

The partly depolymerized dextran according to the invention does not cause a formation of antibodies or the appearance of anaphylactic conditions. It is partly decomposed to glucose in the organism and consumed as such, and partly to larger molecule-fractions which are able to leave the body through the renal system. The velocity of decomposition is almost ideal since a therapeutic dose remains about the length of time which is necessary to remove the state of shock.

In addition to their usefulness for preparing physiological injection fluids, by being employed as regulators of the viscosity and colloid osmotic pressure, the polymer homologs obtained according to the invention, particularly those of dextran, have also proven useful as thickening agents in salves and cosmetic preparations, as so called swelling substances for medical purposes etc.

We claim:

1. A process of preparing polymeric homologs of dextran by the partial depolymerization thereof, comprising subjecting at least partially water soluble microbiologically produced dextran to an acid hydrolytic treatment while limiting the hydrolysis determining factors, temperature, time and acidity, so that only partial breaking down of the starting material takes place, subjecting the reaction mixture obtained to a purification, and recovering such hydrolytically produced products as are completely water soluble and which at a concentration of 0.7 per cent in aqueous solution have a sedimentation constant of from $1.5 \times 10^{-13}$ to $20 \times 10^{-13}$ and a diffusion constant of from $0.2 \times 10^{-7}$ to $8 \times 10^{-7}$ and the relative viscosity of which at a concentration of 4 per cent in aqueous solution shows a value of from 1.5 to 15.

2. A process according to claim 1 in which the hydrolysis is carried out at temperatures between 30° C. and 150° C. and is terminated in less than 24 hours.

3. A process according to claim 1 in which the purification of the reaction mixture after hydrolysis comprises dialysis of the solution.

4. A process according to claim 1 in which the purification of the reaction mixture after hydrolysis comprises precipitation with alcohol.

5. A process of preparing therapeutic injection or infusion fluids using neutral, water soluble polysaccharides, comprising subjecting a polysaccharide, selected from a class consisting of dextran, levulan and galactan, to an acid hydrolytic treatment while limiting the hydrolysis determining factors, temperature, time and acidity, so that only partial breaking down of the starting material takes place, subjecting the reaction mixture obtained to a purification, and recovering such hydrolytically produced products as are completely water soluble and which at a concentration of about 6 per cent show a colloid-osmotic pressure of from 50 to 1000 millimeters water column, and dissolving said recovered hydrolytic product and sodium chloride in water in amounts to yield a physiologically suitable compound.

6. A process of preparing therapeutic injection or infusion fluids using at least partially water soluble, microbiologically produced dextran, comprising subjecting said dextran to an acid hydrolytic treatment while limiting the hydrolysis determining factors, temperature, time and acidity, so that only partial breaking down of the starting material takes place, subjecting the reaction mixture obtained to a purification, and recovering such hydrolytically produced products as are completely water soluble and which at a concentration of 0.7 per cent in aqueous solution have a sedimentation constant of from $1.5 \times 10^{-13}$ to $20 \times 10^{-13}$ and a diffusion constant of from $0.2 \times 10^{-7}$ to $8 \times 10^{-7}$ and the relative viscosity of which at a concentration of 4 per cent in aqueous solution shows a value of from 1.5 to 15, and dissolving said recovered hydrolytic product and sodium chloride in water in amounts to yield a physiologically suitable compound.

7. As new articles of manufacture products mainly consisting of neutral, water soluble polymeric homologs of dextran and which at a concentration of 0.7 per cent in aqueous solution have a sedimentation constant of from $1.5 \times 10^{-13}$ to $20 \times 10^{-13}$ and a diffusion constant of from $0.2 \times 10^{-7}$ to $8 \times 10^{-7}$ and the relative viscosity of which at a concentration of 4 per cent in aqueous solution shows a value of from 1.5 to 15.

8. A therapeutic fluid for injection and infusion purposes comprising sodium chloride and polymeric homologs of dextran dissolved in water, said polymeric homologs having at a concentration of 0.7 per cent in aqueous solution a sedimentation constant of from $1.5 \times 10^{-13}$ to $20 \times 10^{-13}$, a diffusion constant of from $0.2 \times 10^{-7}$ to $8 \times 10^{-7}$ and a relative viscosity at a concentration of 4 per cent in aqueous solution of from 1.5 to 15, said sodium chloride and polymeric homologs being present in such amounts that the fluid presents the colloid-osmotic pressure and relative viscosity of blood plasma.

9. A therapeutic fluid for injection and infusion purposes containing sodium chloride and neutral polymeric homologs of a polysaccharide, selected from a class consisting of dextran, levulan and galactan, dissolved in water, said polymeric homologs showing at a concentration of about 6 per cent a colloid-osmotic pressure of from 50 to 1000 millimeters water column, said sodium chloride and polymeric homologs being present in such amounts that the fluid presents the colloid-osmotic pressure and relative viscosity of blood plasma.

10. A process of preparing therapeutic injection and infusion fluids which comprises subjecting to a partial acid hydrolysis a water soluble polysaccharide, selected from a class consisting of dextran, levulan and galactan under conditions producing hydrolytic products which are completely soluble in water and which at a concentration of about 6 per cent show a colloid-osmotic pressure of from about 50 to 1000 mm. water column, separating and purifying said hydrolytic products from the reaction medium and preparing a therapeutic fluid therefrom.

ANDERS JOHAN TROED GRÖNWALL.
BJÖRN GUSTAF-ADOLF INGELMAN.

REFERENCES CITED

The following references are of record in the file of this patent:

J. A. M. A., April 24, 1943, pages 1337–1342.
Annals of Surgery, August 1941, pages 212–225.